Figure 1:
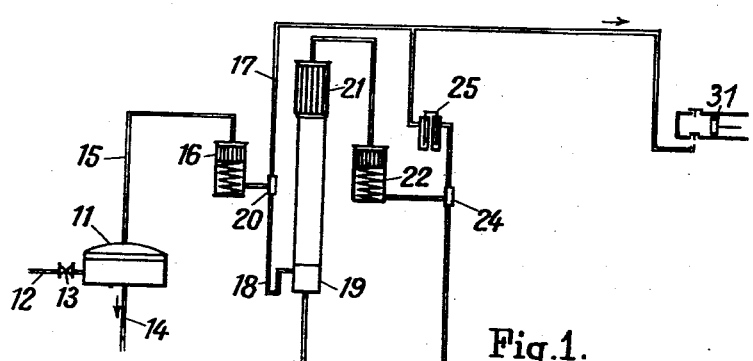

April 28, 1931. A. SCHMALENBACH 1,802,539
PROCESS OF DISTILLATION
Filed Dec. 8, 1925

Inventor:
Adolf Schmalenbach
by [signature]
Atty.

Patented Apr. 28, 1931

1,802,539

UNITED STATES PATENT OFFICE

ADOLF SCHMALENBACH, OF ESSEN-RUHR, GERMANY, ASSIGNOR, BY MESNE ASSIGNMENTS, TO THE KOPPERS COMPANY, OF PITTSBURGH, PENNSYLVANIA, A CORPORATION OF DELAWARE

PROCESS OF DISTILLATION

Application filed December 8, 1925, Serial No. 74,114, and in Germany December 22, 1924.

My invention refers to the distillation of liquids and more especially to a method and means whereby constituents of lower boiling point can be recovered from a mixture of liquids in a particularly easy and efficient manner.

According to the present invention constituents having comparatively low boiling points can be recovered from a mixture of liquids containing the same in a uniform and continuous manner. I am thereby enabled to recover for instance benzene from the washing oil resulting in the distillation of coal, this washing oil containing benzene, the distillation being carried out in vacuo and with a supply of heat from without. In a similar manner crude oil can be split up into two fractions. My invention allows obtaining a higher vacuum (or lower pressure) in the distillation vessel and in consequence thereof a more perfect expulsion, than was hitherto possible, whereby also the advantages resulting from distillation in vacuo (saving of heat and avoiding of decomposition) are increased, while the losses of vapours hitherto experienced are avoided and certain disturbing phenomena such as for instance the decomposition of the lubricating oil of the vacuum pump are done away with.

In the distillation process as hitherto practised the vacuum obtainable suffered by the fact that the condensate in consequence of its composition and the temperature had too high a vapour pressure. In contradistinction thereto according to the present invention the lower boiling constituents are removed by artificial means before entering the vacuum pump. This removal can be effected for instance by washing with a suitable absorbing agent or by separating them out by cooling with the aid of a freezing liquor or the like. I thus provide that the vacuum pump can produce a higher vacuum above the liquid in the distillation vessel, than was hitherto possible, the pump itself being kept free of the solvent vapours and these vapours being prevented from escaping into the free air.

If the washing step mentioned above or the separation by refrigeration were inserted immediately in front of the vacuum pump, there would result the disadvantage that the drop of pressure resulting from the resistances in the conduits from the vacuum pump down to the distillation vessel will exert unfavourable action and I therefore prefer proceeding in such manner that a condenser is inserted immediately behind the distillation vessel, this condenser serving for condensing the whole of the mixed vapours leaving this vessel. By this means I succeed in obtaining the high vacuum desired, inasmuch as the vapour mixture here condensed still contains all the constituents of the solvent which have been vapourized along with the other liquid, these constituents having a low vapour pressure as compared with the substances dissolved and in consequence correspondingly decreasing the total vapour pressure of the condensate. In order now to evaporate again the condensate produced in this condenser, I introduce it directly into the still of a fractionating column provided with a condensing vessel on top of it. The vapours escaping from this vessel consist merely of the dissolved substances and are now condensed in a second condenser at a lower vacuum (or higher pressure). I prefer operating at a lower vacuum in order to prevent the undesired phenomena spoken of above from arising again near the end of the operation.

A further improvement concerns the fact, that as a rule the palpable heat of the solvent driven over and escaping from the distillation plant is utilized for pre-heating fresh constituents of the mixture of liquids to be distilled, this pre-heating operation already leading to a temperature at which low boiling substances evaporate at a lower vacuum, for instance as prevailing in the distillation vessel mounted on the fractionating column. According to this improvement a vapour expelling vessel is inserted in the path of the liquid before it enters the distillation vessel proper and in this vapour expelling vessel the low boiling constituents are expelled from the mixture of liquids to be distilled, without supplying any heat from outside, and are introduced into the rectification column from below, while the liquid from the vapour expelling vessel is conveyed by a siphon into the distilling vessel proper. By thus proceeding I considerably relieve the distilling vessel proper both as to the nature and the quantity of the vapours to be expelled. The uniformity and constancy of the operation is maintained by the fact that the two condensers, one of which is inserted immediately behind the distillation vessel proper, while the other one is connected to the distillation vessel mounted on the rectification column, are connected with one and the same vacuum pump in such manner that in the piping leading from this latter distillation vessel to the condenser following it, a corresponding throttle is inserted which allows regulating the degree of evacuation.

Figure 1A:
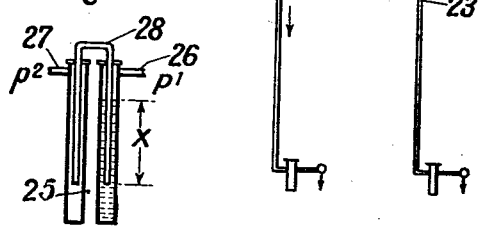

In the drawings affixed to this specification and forming part thereof, a distillation system adapted for the carrying out of the process according to the present invention is illustrated in a purely diagrammatic manner, Fig. 1 being a diagram of a system embodying my invention, while Fig. 1a is a vertical section of a detail.

Figure 2:
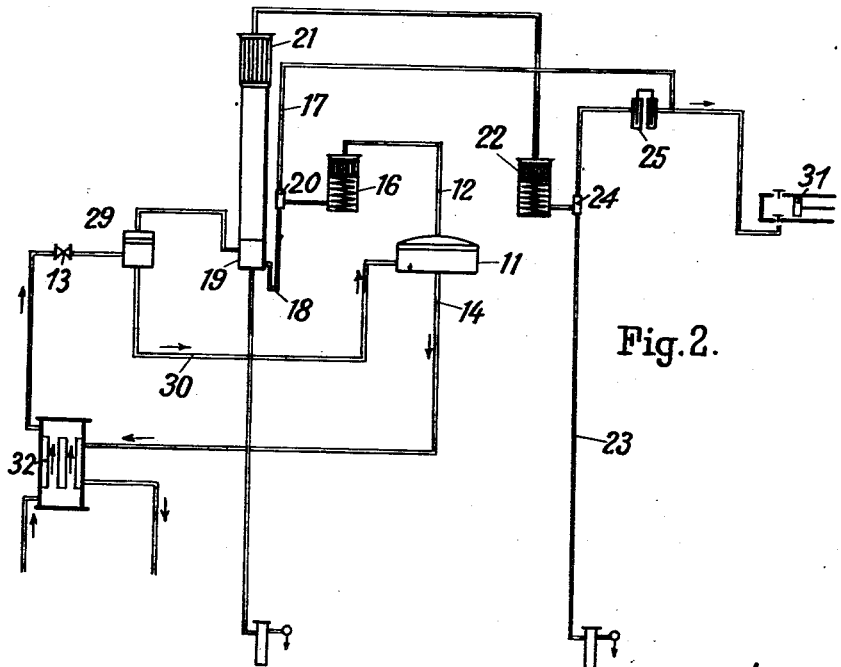

Fig. 2 is a diagram illustrating a modification.

Referring first to Fig. 1, the mixture of liquids to be subjected to distillation passes through the pipe 12 and throttling valve 13 into the distillation vessel proper 11. The solvent freed from the lighter oils in this vessel under the combined action of heat and vacuum escapes through pipe 14. The vapours escaping from the distillation vessel 11 pass through the pipe 15 into the condenser 16, to be condensed therein. The liquid leaving the condenser enters a collection vessel 20 to which is also connected the pipe 17 leading to the vacuum pump 31. The liquid flows from the vessel 20 through the siphon 18 into the distillation vessel 19 at the bottom of the fractionating column 19. The supply of heat to the distillation vessel 19 and the abduction of heat from the distillation vessel 21 mounted on top of this column are regulated in such wise that merely the solvent freed from the dissolved substances leaves the bottom part of the fractionating column in the liquid phase, while at the upper end of the distillation vessel 21 merely the vapours of the substance to be recovered will escape to be condensed in the condenser 22 and to descend through pipe 23. Owing to the circumstance that in the fractionating column and in the second condenser 22 less vacum is needed and should be maintained in order to obtain a perfect recovery of the dissolved substance, the collecting vessel 24 behind the condenser 22 is also connected with the vacuum pump 31, however, a pressure reducing device 25 is inserted between them.

Fig. 1a is an illustration of this pressure reducing device drawn to a larger scale. If the vacuum pump 31 produces a vacuum $p_1$ and if this pump is connected to the pressure reducing device 25 at 26, there exists at the other end of the device at 27 only a pressure $p_2$ which is determined by the hydraulic height of the liquid column $x$ in one of the branches of the pressure reducing vessel so that $p_2 = p_1 - px$. By varying the height of the liquid column $x$ the vacuum can be adjusted within certain limits.

It might also be possible to operate with two vacuum pumps, however, the device above described is not only simpler but also entails the advantage of providing for interruptions of the operation which may for instance arise from leakages, whereby the circulation of the liquid is immediately interrupted.

In the modification illustrated in Fig. 2, the liquid to be driven over first enters a heat exchanging device 32 through the pipe 12. In this device the liquid is pre-heated by the liquid escaping from the distillation vessel proper 11 into the pipe 14. The mixture of liquids thus pre-heated first enters a vapour expelling vessel 29 which is not heated but is merely placed under the limited vacuum of the fractionating column, into the lower part 19 of which these vapours are also introduced. The mixture of liquids which has thus already been once freed from vapours, passes through a pipe 30 forming a siphon into the distillation vessel proper 11, where it is freed from the lighter oils and escapes through pipe 14. The vapours of the distillate escaping from the vessel 11 pass into the condenser 16, are condensed therein and flow through the siphon 18 also into the lower part 19 of the fractionating column. Also in this modification the distillation vessel proper 11 and the condenser 16 communicate directly through the collecting vessel 20 and pipe 17 with the vacuum pump 31, while the fractionating column with the distillation vessel 21 on top of it and the condenser 22, from which the finished distillate escapes through pipe 23, are connected with the same vacuum pump 31 through the pressure reducing device 25.

The process above described allows applying the distillation in vacuo with supply of heat from without with great advantage in all those cases in which the conditions of vapour pressure and the molecular concentration of the solvent and the dissolved substance are similar to the conditions prevailing in washing oil saturated with benzene.

In practising my invention I may for instance proceed as follows:

*Example 1: Recovery of benzene from the washing oil serving for the washing out of benzene from coal distillation gases*

About 1000 kilograms per hour of a washing oil containing about 3% crude benzene and having a temperature of about 35° C., which has previously traversed the heat exchanger 32, being preheated to about 120° C. by the residue from the distillation vessel, are introduced into the vapor expelling vessel 29, the valve 13 having previously been adjusted accordingly. By suitable adjustment of the siphon-like pressure reducing device 25 a vacuum corresponding to a pressure of about 225 mms. mercury column is produced in the vessel 29, whereby about 70% of the benzene and homologues contained in the oil, equal to 21 kilograms crude benzene, are volatilized together with small quantities of low boiling constituents of the washing oil. The residue from the treatment in the vapor expelling vessel 29 is conducted into the distillation vessel 11 where a vacuum equal to a pressure of about 100 mms. mercury column is maintained. In this vessel the liquid is heated to about 145° C., whereby the last traces of crude benzene are driven over. The vapors which also contain small quantities of the washing oil, flow into the condenser 16, where they are cooled down to about 30° C. and condensed. The condensate is conducted into the bottom part of the rectification column and is combined therein with the vapors escaping from the vapor expelling vessel 29. In the rectification is maintained the same vacuum (about 225 mms. mercury column) as in the vessel 29. The liquid is maintained in the column at a temperature of about 150° C., the compartment at the top of the column at about 75° C. Under these conditions there escapes from this compartment a benzene, about 96% of which volatilize at normal pressure up to 180° C. The benzene vapors escaping from the compartment are condensed in the condenser 22 by being cooled down to 25° C. and escape through the pipe 23.

*Example 2: Splitting of crude oil into two fractions*

A crude oil, 27.5% of which distil over at a temperature up to 250° C. and which is subjected during distillation to a loss of gases amounting to 4%, is introduced at a temperature of about 25° C. into the vessel 29, the valve 13 being so adjusted that about 1000 kilograms flow in per hour. In the heat exchanger 32 the crude oil is preheated to about 130° C. In the vessel 29 a vacuum is maintained equal to a pressure of 225 mms. mercury column. In the vessel 29 are thus driven off about 75% of the constituents boiling at and below 250° C. The residue from the vessel 29 is conducted into the distillation vessel, where it is distilled at a pressure of about 80 mms. mercury column and a temperature of 175° C., all constituents boiling at and below 250° C., being thus volatilized. The vapors are condensed at about 25° C. in the condenser 16. The condensate is introduced into the bottom part of the rectification column, where it is combined with the vapors escaping from the vessel 29. In the column is maintained a vacuum equal to about 225 mms. mercury column and a temperature of 180° C., while the temperature at the top of the column is adjusted to 140° C. Under these conditions there escape from the top of the column all constituents of the oil boiling at and below 250° C. The vapors are condensed at 20° C. in the condenser 32.

I wish it to be understood that I do not desire to be limited to the exact steps and sequence of operations and to the particular means above described, for obvious modifications will occur to a person skilled in the art.

I claim:—

1. The method of recovering volatile constituents from a high boiling solvent by continuous distillation under a pressure below 1 atm. and indirect heating comprising separating from said solvent the greater part of the lower boiling constituents of said volatile constituents at a higher pressure than is required for the separation of all the constituents, heating the residue, separating the higher boiling constituents of the said volatile constituents at a lower pressure, combining the distillates thus obtained and subjecting same to common rectification at said higher pressure.

2. The method of recovering volatile constituents from a high-boiling solvent by continuous distillation and indirect heating comprising preheating said solvent, separating from said solvent the lower boiling constituents of said volatile constituents at a higher pressure than is required for the separation of all constituents, heating the residue, separating the higher boiling constituents of said volatile constituents at a lower pressure, combining the distillates thus obtained and subjecting same to common rectification at the higher pressure.

3. The method of recovering volatile constituents from a high boiling solvent by continuous distillation and indirect heating comprising separating from said solvent the lower boiling constituents of said volatile constituents at a higher pressure than is required for the separation of all constituents, heating the residue, separating the higher boiling constituents of said volatile constituents at a lower pressure, bringing about the condensation of said higher boiling constituents, combining said lower boiling constituents in vaporized form with said higher boiling constituents in liquid form and subjecting same to common rectification at the higher pressure.

4. An apparatus for recovering volatile constituents from a high boiling solvent comprising a heat exchanger, pipe lines for conducting to and from said heat exchanger the inflowing solvent and the returning solvent, means for subjecting the said solvent to a higher pressure after it has passed through said heat exchanger, a separator connected with said exchanger for separating the vapors developed under said higher pressure, a still, means for indirectly heating said still, a condenser connected with said still, means for generating a vacuum in said still and said condenser, a rectification column the lower end of which is below said condenser, a siphon connecting said condenser with said rectification column, a pipe line connecting said separator with said column and a reducing device inserted between said column and said means for generating vacuum, said reducing device comprising two vessels of siphon-like character of which the outlets are connected up with each other and with other parts of said apparatus.

In testimony whereof I affix my signature.

ADOLF SCHMALENBACH.